US009575830B2

United States Patent
Chen et al.

(10) Patent No.: US 9,575,830 B2
(45) Date of Patent: Feb. 21, 2017

(54) RUN-TIME ERROR REPAIRING METHOD, DEVICE AND SYSTEM

(71) Applicant: TENCENT TECHNOLOGY (SHENZHEN) COMPANY LIMITED, Shenzhen (CN)

(72) Inventors: Xudong Chen, Shenzhen (CN); Xiangwei Song, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 125 days.

(21) Appl. No.: 14/410,653

(22) PCT Filed: Jul. 2, 2013

(86) PCT No.: PCT/CN2013/078641
§ 371 (c)(1),
(2) Date: Dec. 23, 2014

(87) PCT Pub. No.: WO2014/005506
PCT Pub. Date: Jan. 9, 2014

(65) Prior Publication Data
US 2015/0193296 A1 Jul. 9, 2015

(30) Foreign Application Priority Data
Jul. 2, 2012 (CN) .......................... 2012 1 0224763

(51) Int. Cl.
G06F 11/00 (2006.01)
G06F 11/07 (2006.01)
(52) U.S. Cl.
CPC ....... *G06F 11/0793* (2013.01); *G06F 11/0706* (2013.01); *G06F 11/079* (2013.01); *G06F 11/0778* (2013.01)

(58) Field of Classification Search
CPC . G06F 11/0706; G06F 11/0778; G06F 11/079; G06F 11/0793
See application file for complete search history.

(56) References Cited

U.S. PATENT DOCUMENTS 6,629,267 B1   9/2003  Glerum et al.
7,146,531 B2  12/2006  Sarra et al.
(Continued)

FOREIGN PATENT DOCUMENTS

CN   1470985 A    1/2004
CN  101529385 A    9/2009
(Continued)

OTHER PUBLICATIONS

Office Action for CN Application No. 201210224763.5 dated Dec. 8, 2014.
(Continued)

Primary Examiner — Joshua P Lottich
(74) Attorney, Agent, or Firm — Marshall, Gerstein & Borun LLP

(57) ABSTRACT

Various embodiments of the present disclosure describe a method, device, and system for repairing run-time errors. The method includes at a client side, obtaining dump file information and version information of an application where a run-time error occurs; calculating the obtained dump file information and version information according to a preset algorithm to get an error identification associated with the run-time error; sending an error report carrying the error identification to an error information acquisition server; receiving a repair application issued by the error information acquisition server according to the error identification; and activating the repair application to perform repairing. When
(Continued)

embodiments of the present disclosure are employed, the time required for repairing application run-time errors can be reduced.

15 Claims, 9 Drawing Sheets

(56) References Cited

U.S. PATENT DOCUMENTS

| | | | |
|---|---|---|---|
| 7,490,268 B2 | 2/2009 | Keromytis et al. | |
| 8,473,251 B1* | 6/2013 | Noth | G06F 11/0742 |
| | | | 702/183 |
| 9,436,533 B2* | 9/2016 | Hermany | G06F 11/0742 |
| 2003/0208593 A1* | 11/2003 | Bharati | G06F 11/0748 |
| | | | 709/224 |
| 2004/0098640 A1* | 5/2004 | Smith | G06F 11/366 |
| | | | 714/39 |
| 2004/0153823 A1* | 8/2004 | Ansari | G06F 11/0715 |
| | | | 714/38.14 |
| 2005/0038832 A1* | 2/2005 | Feigenbaum | G06F 11/0793 |
| 2006/0190770 A1* | 8/2006 | Harding | G06F 11/3604 |
| | | | 714/38.11 |
| 2006/0195745 A1* | 8/2006 | Keromytis | G06F 11/0742 |
| | | | 714/741 |
| 2006/0277442 A1* | 12/2006 | Lantz | G06F 11/0742 |
| | | | 714/38.1 |
| 2009/0158099 A1* | 6/2009 | Cui | G06F 11/0748 |
| | | | 714/57 |
| 2009/0265587 A1 | 10/2009 | Yamaguchi | |
| 2013/0067285 A1* | 3/2013 | Szegedi | G06F 21/6254 |
| | | | 714/45 |
| 2013/0152056 A1* | 6/2013 | Chang | G06F 11/0742 |
| | | | 717/131 |

FOREIGN PATENT DOCUMENTS

| | | |
|---|---|---|
| CN | 101567807 A | 10/2009 |
| CN | 101621818 A | 1/2010 |
| CN | 102023906 A | 4/2011 |
| CN | 102056202 A | 5/2011 |
| JP | 2004178296 A | 6/2004 |
| JP | 2006319828 A | 11/2006 |
| JP | 2008547070 A | 12/2008 |
| KR | 20030096695 A | 12/2003 |

OTHER PUBLICATIONS

Second Office Action for CN Application No. 201210224763.5 dated Jun. 1, 2015.
First Office Action for Taiwan Application No. 102123663 dated Jan. 26, 2015.
Third Office Action for Taiwan Application No. 102123663 dated Dec. 30, 2015.
International Preliminary Report on Patentability of PCT/CN2013/078641 dated Apr. 2, 2015.
Notice of Non-Final Rejection for KR Application No. 10-2015-7002809 dated Dec. 11, 2015.
Search Report in Application No. PCT/CN2013/078641 dated Sep. 19, 2013.

* cited by examiner

RUN-TIME ERROR REPAIRING METHOD, DEVICE AND SYSTEM

CROSS-REFERENCE TO RELATED APPLICATIONS

This application is a U.S. national phase application under 35 U.S.C. §371 of International Application No. PCT/CN2013/078641, filed Jul. 2, 2013, entitled "RUN-TIME ERROR REPAIRING METHOD, DEVICE AND SYSTEM", which claims the priority of Chinese Patent Application No. 201210224763.5 filed Jul. 2, 2012, the entire respective disclosures of which are incorporated herein by reference.

FIELD OF THE INVENTION

Embodiments of the present disclosure relate to computer technologies and the network security field, and more particularly, to a method, apparatus, and system for repairing run-time errors.

BACKGROUND OF THE INVENTION

Currently, more and more applications are installed on computers by users. When an application is running, an unknown application run-time error may occur due to design bugs of the application or influence of a Trojan plug-in program, which may cause the application to run improperly. Therefore, the application needs to be timely repaired to avoid affecting normal operations of the users.

SUMMARY OF THE INVENTION

Embodiments of the present disclosure describe a method for repairing run-time errors, which can reduce the time required for repairing application run-time errors.

Embodiments of the present disclosure describe devices for repairing run-time errors, which can reduce the time required for repairing application run-time errors.

Embodiments of the present disclosure describe a system for repairing run-time errors, which can reduce the time required for repairing application run-time errors.

Various embodiments of the present disclosure describe a method for repairing run-time errors, including:
  obtaining, by a client, dump file information and version information of an application where a run-time error occurs;
  calculating the obtained dump file information and version information according to a preset algorithm to get an error identification associated with the run-time error;
  sending an error report carrying the error identification to an error information acquisition server;
  receiving a repair application issued by the error information acquisition server according to the error identification; and
  activating the repair application to perform repairing.

Various embodiments of the present disclosure describe a client, including:
  an error reporting module, configured to
  obtain dump file information and version information of an application where a run-time error occurs,
  calculate the obtained dump file information and version information according to a preset algorithm to get an error identification associated with the run-time error, and
  send an error report carrying the error identification to an error information acquisition server; and
  a repairing module, configured to
  receive a repair application issued by the error information acquisition server according to the error identification, and
  activate the repair application to perform repairing.

Various embodiments of the present disclosure describe an error information acquisition server, including:
  a receiving module, configure to
  receive an error report carrying an error identification associated with a run-time error that is sent from a client, and
  send the error report to a repair application querying module;
  the repair application querying module, configured to
  query whether a repair application associated with the error identification is stored locally, and
  when the repair application associated with the error identification is stored locally, send the repair application to a sending module; and
  the sending module, configured to send received information to the client.

Various embodiments of the present disclosure describe a system for repairing run-time errors, including:
  a client, configured to
  send an error report carrying a calculated error identification associated with a run-time error to an error information acquisition server, and
  activate a received repair application to perform repairing; and
  the error information acquisition server, configured to
  receive the error report carrying the error identification, and
  issue the repair application associated with the error identification to the client.

As can be seen from the above technical scheme, according to the method, device, and system described in various embodiments of the present disclosure, dump file information and version information of an application where a run-time error occurs may be obtained. The obtained dump file information and version information may be calculated according to a preset algorithm to get an error identification associated with the run-time error. An error report carrying the error identification may be sent to an error information acquisition server. A repair application issued by the error information acquisition server according to the error identification may be received. The repair application may be activated to perform repairing. In this way, the repair application associated with the error identification is pre-configured in the error information acquisition server. When monitoring that the unknown application run-time error occurs in the application that is running, the repair application associated with the error identification is downloaded from the error information acquisition server to repair the application where the unknown application run-time error occurs. Therefore, the error occurring in the user application can be promptly repaired and the time required for repairing the error can be reduced.

DETAILED DESCRIPTION OF THE INVENTION

Hereinafter, the present disclosure will be described in further detail with reference to the accompanying drawings and exemplary embodiments.

Figure 1:
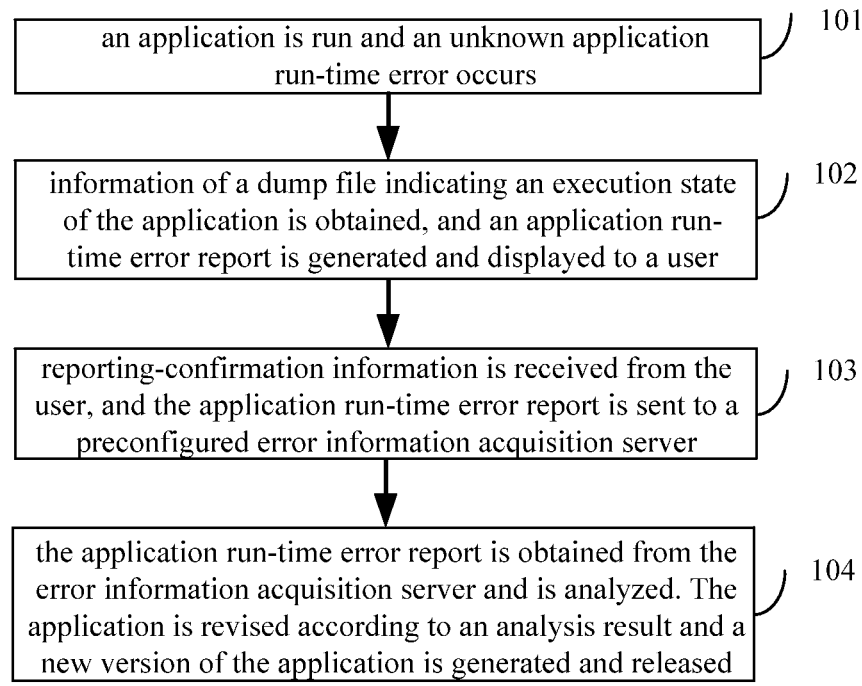
FIG. 1 is a flowchart illustrating a conventional method for repairing application run-time errors, according to an example embodiment of the present disclosure.

FIG. 1 is a flowchart illustrating a conventional method for repairing application run-time errors, according to an example embodiment of the present disclosure. As shown in FIG. 1, the method may include following operations.

At block 101, an application is run and an unknown application run-time error occurs.

In this case, the application run-time error may be caused by defects of the application or by external factors such as a Trojan plug-in program.

At block 102, information of a dump file indicating an execution state of the application is obtained, and an application run-time error report is generated and displayed to a user.

In this case, an error capturing module in a client captures the unknown application run-time error using an exception handling mechanism of the operating system, stores the execution state of the application to the dump file through an application programming interface of the operating system, and generates the application run-time error report by combining application version information and run log information.

At block 103, reporting-confirmation information is received from the user, and the application run-time error report is sent to a preconfigured error information acquisition server.

In this case, an error reporting module in the client submits the application run-time error report to the error information acquisition server which collects the application run-time error information. In this case, multiple application providers may share the error information acquisition server.

At block 104, the application run-time error report is obtained from the error information acquisition server and is analyzed. The application is revised according to an analysis result and a new version of the application is generated and released.

In this case, relevant technical staff run debug commands through the application run-time error report, open the dump file storing a process state, analyze the process state when the unknown application run-time error occurs, find a reason of the application run-time error, and fix bugs of application codes. The modified application codes are merged into a next version of the application to generate the new version of the application. Finally, the new version of the application is released through an application upgrade server designated by the application provider.

As can be seen from the above descriptions that through the conventional method for repairing the application run-time errors, when the unknown application run-time error occurs in the application, the user needs to query the information of a server designated by the application and access the server designated by the application to download the new version of the application to repair the run-time error. As such, the time required for repairing the application run-time error is long and the run-time error is not handled timely, and therefore user experience is affected.

In order to solve the issue that the application run-time error is not timely repaired, according to various embodiments of the present disclosure, a repair application used for repairing the application run-time error is pre-configured in the error information acquisition server and functions like downloading and activating a solution of the application run-time error are added. When the unknown application run-time error occurs in the application, the application run-time error report is submitted to the error information acquisition server. The error information acquisition server may query, according to the application run-time error report, whether a corresponding repair application is stored locally. If the corresponding repair application is stored locally, the error information acquisition server may automatically issue the repair application. If the corresponding repair application is not stored locally, the relevant technical staff may analyze the application run-time error report and determine a corresponding solution, develop the repair application used for repairing the run-time error, and configure the repair application in the error information acquisition server, so that the repair application can be timely issued when the same application run-time error report is received subsequently.

According to various embodiments of the present disclosure, the repair application is an executable program, which has a unified start-up interface. A client may download the executable program from the error information acquisition server. When the downloading is completed, the client may run the executable program to repair the application run-time error.

Figure 2:
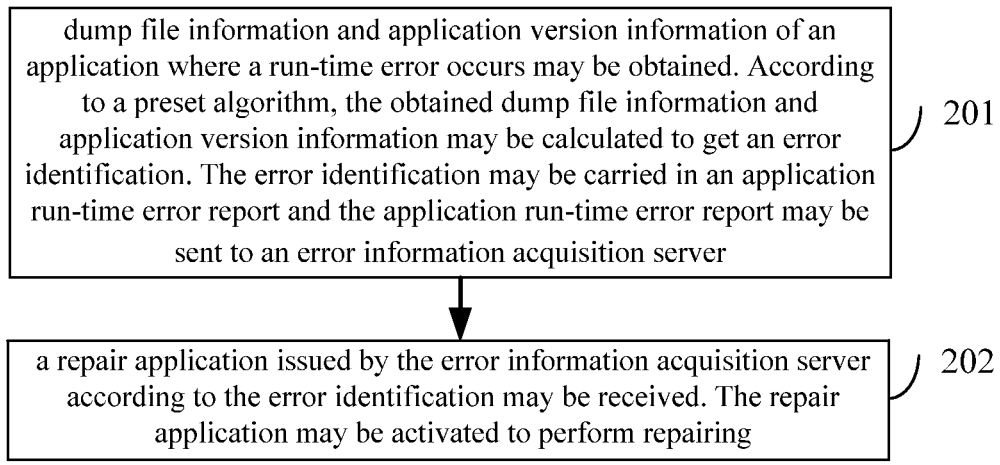
FIG. 2 is a flowchart illustrating a method for repairing run-time errors, according to an example embodiment of the present disclosure.

FIG. 2 is a flowchart illustrating a method for repairing run-time errors, according to an example embodiment of the present disclosure. Referring to FIG. 2, the method may include following operations.

At block 201, dump file information and application version information of an application where a run-time error occurs may be obtained. According to a preset algorithm, the obtained dump file information and application version information may be calculated to get an error identification. The error identification may be carried in an application run-time error report and the application run-time error report may be sent to an error information acquisition server.

At block 202, a repair application issued by the error information acquisition server according to the error identification may be received. The repair application may be activated to perform repairing.

Hereinafter, various embodiments of the present disclosure are described in detail based on FIG. 2.

Figure 3:
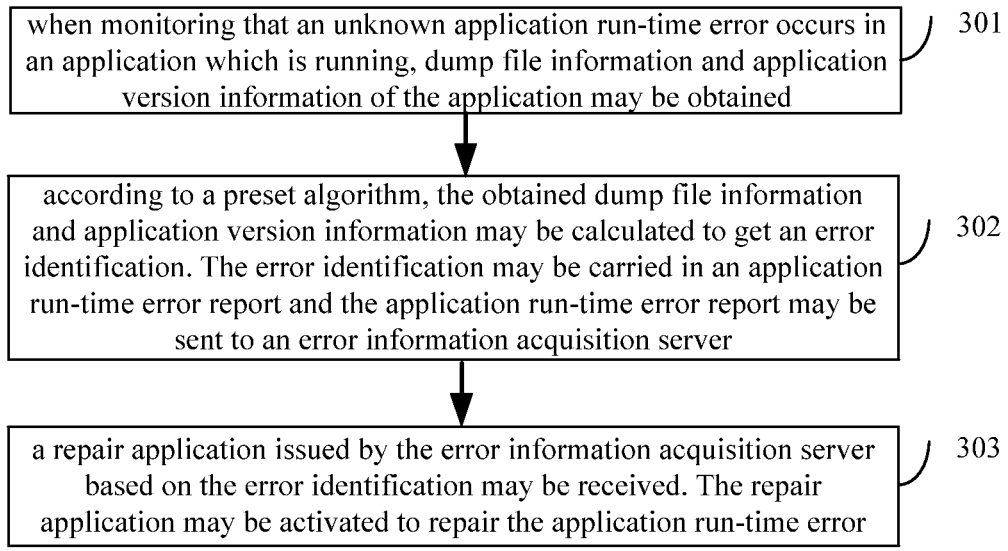
FIG. 3 is a flowchart illustrating a method for repairing run-time errors, according to an example embodiment of the present disclosure.

FIG. 3 is a flowchart illustrating a method for repairing run-time errors, according to an example embodiment of the present disclosure. Referring to FIG. 3, the method may include following operations.

At block 301, when monitoring that an unknown application run-time error occurs in an application which is running, dump file information and application version information of the application may be obtained.

In this case, when the application is running, an execution state of the application is stored in a dump file through an application programming interface of the operating system. Formats of dump files in different operating systems are the same.

At block 302, according to a preset algorithm, the obtained dump file information and application version information may be calculated to get an error identification. The error identification may be carried in an application run-time error report and the application run-time error report may be sent to an error information acquisition server.

In this case, the dump file information and application version information stored and log information may be obtained to generate the application run-time error report.

In order to ensure that subsequently-developed solutions correspond to unknown application run-time errors one-to-one, according to various embodiments of the present disclosure, error identifications are used to distinguish the unknown application run-time errors occurring during the running of applications.

In the embodiments of the present disclosure, when the client generates the application run-time error report, the client may generate, based on the obtained dump file information and application version information, the unique error identification associated with the unknown application run-time error according to the preset algorithm. As the error identification is generated according to the dump file information and the application version information and the formats of the dump files stored in the different operating systems are the same, the error identification is independent of the version of the operating system. For example, in the operating systems like win7, winXP, etc., if a same run-time error occurs in a same version of a same application, i.e., the stored dump file information is the same, the calculated error identifications are the same. According to an embodiment of the present disclosure, different versions of the same application may not be compatible with each other. As such, even if the same run-time error occurs, the calculated error identifications may be different due to different application version information, and therefore the codes of corresponding repair applications may be different. Based on this, according to various embodiments of the present disclosure, the same run-time error occurring in different versions of the same application may be repaired by a repair application of a corresponding version. In practice, because the latest version of the repair application may be compatible with other versions of the repair application, the same run-time error generated in the different versions of the same application may be repaired by the latest version of the repair application. That is, the error information acquisition server may query whether a version number of the repair application associated with the error identification is the latest version number of the repair application stored in the error information acquisition server. If the version number of the repair application associated with the error identification is the latest version number of the repair application stored in the error information acquisition server, the repair application associated with the error identification is issued. Otherwise, the latest version of the repair application is issued.

According to various embodiments of the present disclosure, the preset algorithm may include the fifth edition encryption algorithm of Message Digest Algorithm (MD5), Base64 encryption algorithm, etc. In practice, the algorithm may ensure that the same error identification may be generated for the same unknown application run-time error when different users use the same version of the application. In this way, the error information acquisition server may classify application run-time errors according to error identifications, so as to facilitate development staff to analyze and process errors with the same error identification.

According to various embodiments of the present disclosure, when the client generates the error identification, the client may display the error identification to the user and prompt the user whether to send the error report or not.

Figure 4:
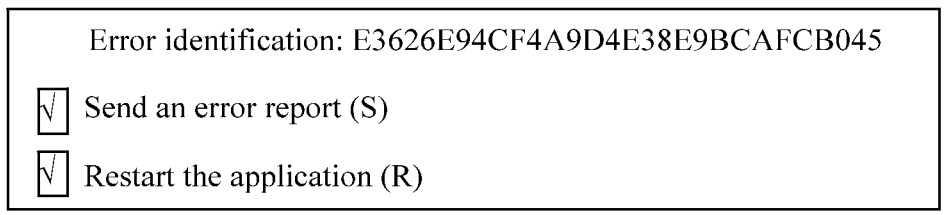
FIG. 4 is a diagram illustrating an error identification, according to an example embodiment of the present disclosure.

FIG. 4 is a diagram illustrating an error identification, according to an example embodiment of the present disclosure. Referring to FIG. 4, an error identification is E3626E94CF4A9D4E38E9BCAFCB045, which is calculated by the client according to dump file information and application version information obtained when an unknown application run-time error occurs in an application and in accordance with a preset algorithm (e.g., MD5). Options including "Send an error report (S)" and "Restart the application (R)" are configured below the error identification shown in FIG. 4. The user may determine whether to send the error report by selecting the appropriate option.

At block 303, a repair application issued by the error information acquisition server may be received. The repair application may be activated to repair the application run-time error. In this case, the repair application is searched out by the error information acquisition server according to the error identification.

In this case, the repair application is searched out by the error information acquisition server according to the error identification. The repair application is configured after analyzing the application run-time error report carrying the error identification and submitted by the client. The repair application may include a repair application associated with the error identification that is currently configured and a repair application associated with the error identification that is not currently configured.

According to various embodiments of the present disclosure, after receiving the application run-time error report carrying the error identification, the error information acquisition server may search based on the error identification. When the error information acquisition server searches out the repair application associated with the error identification that is configured locally, which indicates that the error information acquisition server has analyzed an application run-time error report previously submitted and generated the repair application and the unknown application run-time error has been repaired, the error information acquisition server may automatically issue the repair application associated with the error identification to the client. The client may repair the application where the unknown application run-time error occurs according to the received repair application. As such, the application run-time error is automatically repaired without pre-storing or querying by the user the information of the server designated by the application. The user does not need to access the server designated by the application, so that the application run-time error is timely repaired and the time required for repairing the application run-time error is reduced, and therefor user experiences are enhanced.

In practice, if the error information acquisition server does not find the repair application associated with the error identification, which indicates that the unknown application run-time error occurring during the running of the application is not repaired, the error information acquisition server may store the received application run-time error report and provide the report to the relevant technical staff. The relevant technical staff may open the dump file storing the process state through running a debug command, analyze the process state when the unknown application run-time error occurs, and find a reason of the application run-time error. The relevant technical staff may repair bugs in the application codes to form the repair application associated with the error identification and configure the repair application in the error information acquisition server according to the error identification.

According to various embodiments of the present disclosure, when the repair application associated with the error identification is not found, the error information acquisition server may mark the user submitting the application run-time error report. When monitoring that the repair application associated with the error identification is configured, the error information acquisition server may issue the repair application to the marked user.

In practice, because the latest version of the application is compatible with other versions of the application, the relevant technical staff may develop the repair application based on the latest version of the application stored in the error information acquisition server. As such, when the error information acquisition server searches out the repair application associated with the error identification that is stored locally, the error information acquisition server may determine whether a version number of the repair application associated with the error identification is the latest version number of the repair application stored in the error information acquisition server. If the version number of the repair application associated with the error identification is the latest version number of the repair application stored in the error information acquisition server, the error information acquisition server may issue the repair application associated with the error identification. Otherwise, the error information acquisition server may issue the latest version of the repair application. In this case, the version number may be represented by a time point at which the repair application is configured in the error information acquisition server. In this way, the client can repair other errors in the application except the unknown application run-time error according to the latest version of the repair application.

According to various embodiments of the present disclosure, after the operation of receiving the application run-time error report carrying the error identification, the method may further include following operations. The application run-time error report is analyzed to obtain the dump file information. If the obtained dump file information includes a preset plug-in field, a message indicating that the unknown application run-time error is caused by external factors is carried when the repair application is issued to the client.

In this case, the relevant technical staff may determine, through analyzing the dump file in the submitted application run-time error report, whether the run-time error is caused by external factors such as the Trojan plug-in or by defects of the application. When determining that the application run-time error is caused by the Trojan plug-in, the plug-in field causing the application run-time error is extracted from the dump file and stored in the error information acquisition server. In this way, if the dump file information submitted by the client includes one or more plug-in fields, it may be determined that the application run-time error is caused by the external factors such as the Trojan plug-in. As such, the user may be promptly alerted so as to avoid misunderstandings of the user and user loss of the application.

Hereinafter, two example embodiments of the present disclosure are described in further detail.

Figure 5:
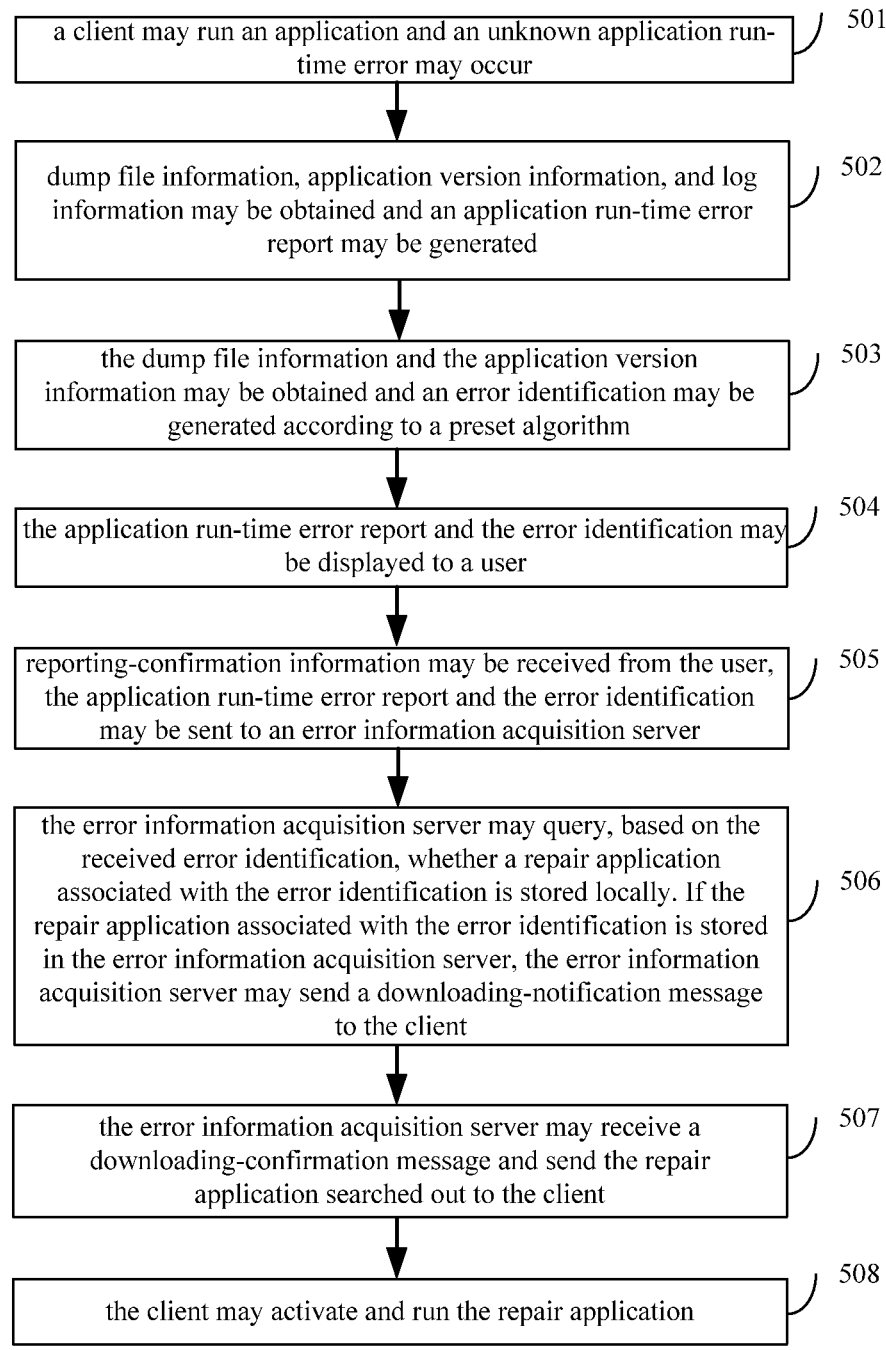
FIG. 5 is a flowchart illustrating a method for repairing run-time errors, according to a first example embodiment of the present disclosure.

FIG. 5 is a flowchart illustrating a method for repairing run-time errors, according to a first example embodiment of the present disclosure. Referring to FIG. 5, the method may include following operations.

At block 501, a client may run an application and an unknown application run-time error may occur.

In this case, the unknown application run-time error occurring during the running of the application may be caused by defects of the application or by external factors such as a Trojan plug-in.

At block 502, dump file information, application version information, and log information of the application where the run-time error occurs may be obtained and an application run-time error report may be generated.

At block 503, the dump file information and the application version information may be obtained and an error identification may be generated according to a preset algorithm.

In this case, an error capturing module may calculate the obtained dump file information and application version information according to the preset algorithm to generate the unique error identification associated with the run-time error.

At block 504, the application run-time error report and the error identification may be displayed to a user.

In this case, displaying the application run-time error report and the error identification to the user is to prompt the user to submit the application run-time error report and the error identification.

At block 505, reporting-confirmation information may be received from the user, the application run-time error report and the error identification may be sent to an error information acquisition server.

In this case, the client may store address information of the error information acquisition server in advance. A reporting module in the client may send the application run-time error report and the error identification to the error information acquisition server according to the address information of the error information acquisition server.

At block 506, the error information acquisition server may query, based on the received error identification, whether a repair application associated with the error identification is stored locally. If the repair application associated with the error identification is stored in the error information acquisition server, the error information acquisition server may send a downloading-notification message to the client to notify the client to download the repair application.

In this case, after receiving the application run-time error report and the error identification, the error information acquisition server may query whether a solution associated with the error identification, i.e., the repair application associated with the error identification, is configured on the error information acquisition server. If the repair application associated with the error identification is configured on the error information acquisition server, the error information acquisition server may notify the client to download the repair application.

In practice, when the error information acquisition server determines that the repair application associated with the error identification is stored locally, the error information acquisition server may directly send the repair application associated with the error identification to the client, rather than send the downloading-notification message to the client.

Figure 6:
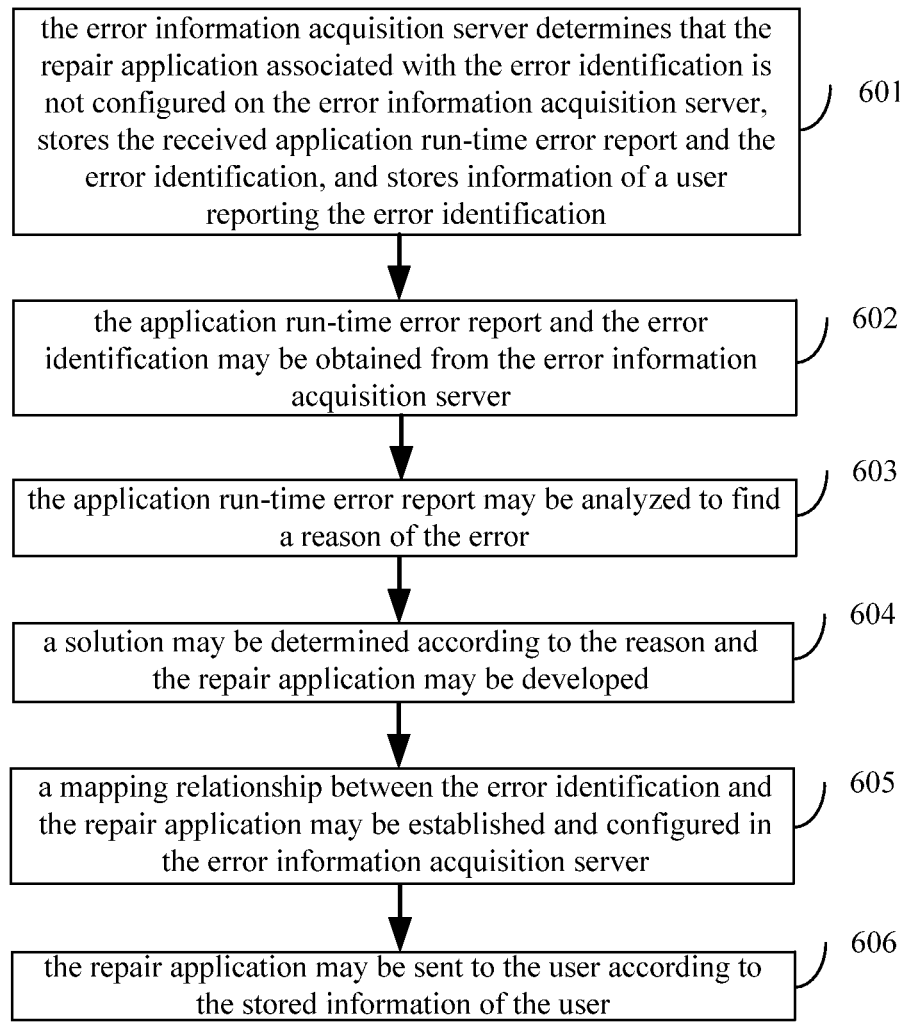
FIG. 6 is a flowchart illustrating a method for repairing run-time errors, according to a second example embodiment of the present disclosure.

FIG. 6 may illustrate a process related to a situation in which the repair application associated with the error identification is not stored in the error information acquisition server, which is described later.

At block 507, the error information acquisition server may receive a downloading-confirmation message and send the repair application searched out to the client.

In this case, the client may receive the downloading-notification message and display the message to the user to prompt the user whether or not to download the repair application. If the user agrees to download the repair application, the downloading-confirmation message may be sent to the error information acquisition server and the repair application may be downloaded from the error information acquisition server.

At block 508, the client may activate and run the repair application.

In this case, after downloading the repair application, the client may activate and run the repair application to repair the run-time error occurring during the running of the application.

FIG. 6 is a flowchart illustrating a method for repairing run-time errors, according to a second example embodiment of the present disclosure. Referring to FIG. 6, the method may include following operations.

At block 601, the error information acquisition server determines that the repair application associated with the error identification is not configured on the error information acquisition server. The error information acquisition server may store the received application run-time error report and the error identification, and store information of a user reporting the error identification.

At block 602, the application run-time error report and the error identification may be obtained from the error information acquisition server.

In this case, the relevant technical staff may periodically obtain the application run-time error report and the error identification from the error information acquisition server, so as to repair the appropriate application run-time error.

At block 603, the application run-time error report may be analyzed to find a reason of the error.

At block 604, a solution may be determined according to the reason and the repair application may be developed.

In this case, the relevant technical staff of the application provider may find the reason of the application run-time error by analyzing the application run-time error report returned by the user, repair bugs in the application codes and develop the repair application.

At block 605, a mapping relationship between the error identification and the repair application may be established and configured in the error information acquisition server.

In this case, the relevant technical staff may develop the repair application based on the application run-time error report. The repair application may have a unified start-up interface and functions of the repair application may be different with different run-time errors. Finally, configurations on run-time errors sharing a same error identification may be performed on the error information acquisition server and the repair application may be uploaded.

At block 606, the repair application may be sent to the user according to the stored information of the user.

In this case, the error information acquisition server may search out the information of the user associated with the error identification based on the error identification of the uploaded repair application and a correspondence relationship between the stored information of the user and the error identification, and send the repair application to the user. In this way, the client may repair the run-time error. Further, when the same run-time error occurs in the same application running in other clients, the corresponding solution may be downloaded and the repair application may be activated to promptly repair the application run-time error.

As can be seen from the above descriptions that according to the method of repairing application run-time errors described in various embodiments of the present disclosure, a repair application associated with an error identification of a run-time error is pre-configured in the error information acquisition server. When monitoring that the run-time error occurs in an application which is running, dump file information and application version information of the application are obtained and the error identification is generated according to a preset algorithm. An error report is generated based on the obtained dump file information, the application version information, and log information and is sent to the error information acquisition server. The repair application associated with the error identification is downloaded from the error information acquisition server, so as to repair the application where the run-time error occurs without pre-storing or querying by the user the information of the server designated by the application. The user does not need to access the server designated by the application, so that the application run-time error is promptly repaired and the time required for repairing the application run-time error is reduced, and therefor user experiences are enhanced and stability of the application is improved. In addition, it is determined whether the obtained dump file information includes a preset plug-in field through analyzing the application run-time error report. As such, for an application run-time error caused by the external factors such as the Trojan plug-in, the user may be promptly alerted to avoid misunderstandings of the user and user loss of the application.

Figure 7:
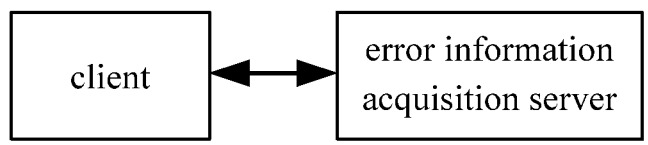
FIG. 7 is a diagram illustrating a structure of a system for repairing run-time errors, according to an example embodiment of the present disclosure.

FIG. 7 is a diagram illustrating a structure of a system for repairing run-time errors, according to an example embodiment of the present disclosure. Referring to FIG. 7, the system may include a client and an error information acquisition server.

The client may send an error report to the error information acquisition server, in which a calculated error identification is carried in the error report by the client. The client may activate a received repair application to perform repairing.

According to various embodiments of the present disclosure, the client may be personal computers, personal digital assistants, cell phones and so on.

Specifically, when the client monitors that an unknown application run-time error occurs in an application which is running, the client may obtain dump file information, application version information, and log information of the application and generate the application run-time error report. The client may calculate the obtained dump file information and application version information according to a preset algorithm to get the error identification. The error identification may be carried in the error report by the client and sent to the error information acquisition server. The client may receive the repair application issued by the error information acquisition server and activate the received repair application to perform repairing.

The error information acquisition server may receive the application run-time error report carrying the error identification, and issue the repair application associated with the error identification searched out to the client.

According to various embodiments of the present disclosure, the error information acquisition server may query, based on the error identification, whether the repair application is stored in the error information acquisition server, in which the repair application is configured after analyzing the application run-time error report carrying the error identification. Specifically, the error information acquisition server may receive the error report carrying the error identification and query whether the repair application associated with the error identification is stored in the error information acquisition server. When the repair application associated with the error identification is stored in the error information acquisition server, the error information acquisition server may issue the repair application to the client. When the repair application associated with the error identification is not stored in the error information acquisition server, the error information acquisition server may store and output the received application run-time error report and the error identification, and store information of a user reporting the error identification. The error information acquisition server may receive a configured repair application, establish a mapping relationship between the error identification and the repair application, and issue the repair application to the client corresponding to the stored information of the user reporting the error identification.

According to various embodiments of the present disclosure, the error information acquisition server may analyze the application run-time error report to obtain the dump file information. If the obtained dump file information includes a preset plug-in field, the error information acquisition server may carry a message indicating that the unknown application run-time error is caused by external factors when the repair application is issued to the client.

Figure 8A:
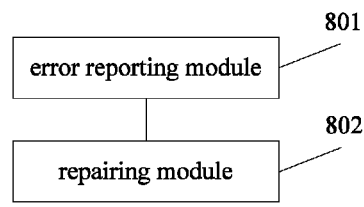
FIG. 8A is a diagram illustrating a structure of a client, according to an example embodiment of the present disclosure.

In this case, the client is one of devices for repairing application run-time errors described in various embodiments of the present disclosure. The client may include an error reporting module 801 and a repairing module 802 (as shown in FIG. 8A).

The error reporting module 801 may obtain the dump file information and application version information of the application where the run-time error occurs, calculate the obtained dump file information and application version information according to the preset algorithm to get the error identification. The error identification may be carried in the application run-time error report by the error reporting module 801 and the error reporting module 801 may send the application run-time error report to the error information acquisition server.

The repairing module 802 may receive the repair application issued by the error information acquisition server according to the error identification, and activate the repair application to perform repairing.

Figure 8B:
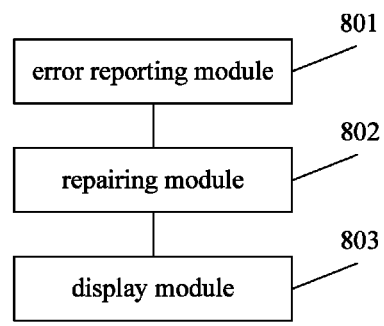
FIG. 8B is a diagram illustrating a structure of a client, according to an example embodiment of the present disclosure.

As shown in FIG. 8B, the client may include a display module 803. After the error reporting module 801 generates the error identification, the display module 803 may display the error identification and a message indicating whether or not to send the application run-time error report. The display module 803 may receive sending-confirmation information and trigger the error reporting module 801 to send the application run-time error report to the error information acquisition server.

Figure 9A:
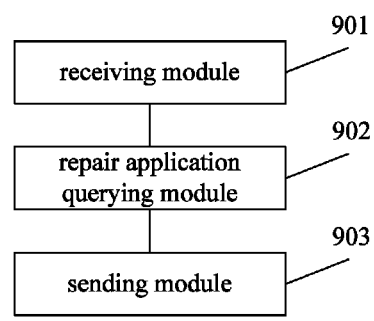
FIG. 9A is a diagram illustrating a structure of an error information acquisition server, according to an example embodiment of the present disclosure.

The error information acquisition server is one of the devices for repairing application run-time errors described in various embodiments of the present disclosure. The error information acquisition server may include a receiving module 901, a repair application querying module 902, and a sending module 903 (as shown in FIG. 9A).

The receiving module 901 may receive the application run-time error report carrying the error identification that is sent from the client, and send the application run-time error report to the repair application querying module 902.

The repair application querying module 902 may query whether the repair application associated with the error identification is stored locally. When the repair application associated with the error identification is stored locally, the repair application querying module 902 may send the repair application to the sending module 903.

According to various embodiments of the present disclosure, when the repair application associated with the error identification is not stored locally, the repair application querying module 902 may send the application run-time error report carrying the error identification to an error report storage module 904. The repair application querying module 902 may receive the configured repair application, establish the mapping relationship between the error identification and the configured repair application, and send the configured repair application to the sending module 903.

The sending module 903 may send received information to the client.

According to various embodiments of the present disclosure, the repair application querying module 902 may query whether a version number of the repair application associated with the error identification is the latest version number of the repair application stored in the error information acquisition server. If the version number of the repair application associated with the error identification is the latest version number of the repair application stored in the error information acquisition server, the repair application querying module 902 may send the repair application associated with the error identification to the sending module 903. Otherwise, the repair application querying module 902 may send the latest version of the repair application to the sending module 903.

Figure 9B:
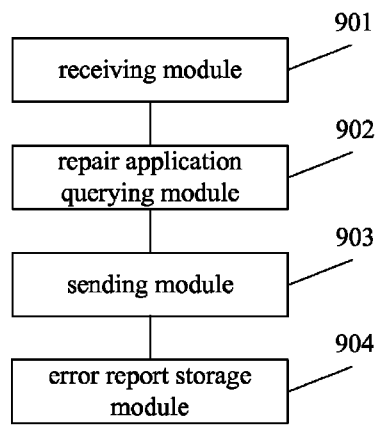
FIG. 9B is a diagram illustrating a structure of an error information acquisition server, according to an example embodiment of the present disclosure.

As shown in FIG. 9B, the error information acquisition server may further include the error report storage module 904, which may store the received application run-time error report and the error identification.

According to various embodiments of the present disclosure, the error report storage module 904 may store the information of the user reporting the error identification.

Figure 9C:
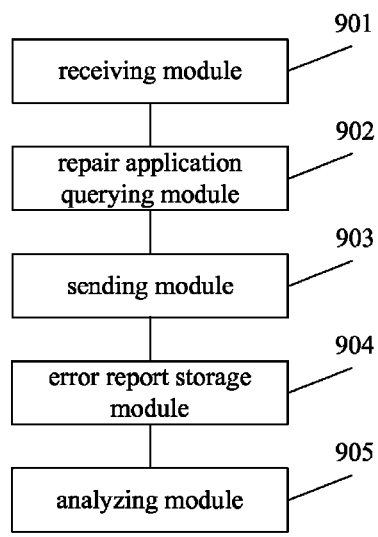
FIG. 9C is a diagram illustrating a structure of an error information acquisition server, according to an example embodiment of the present disclosure.

As shown in FIG. 9C, the error information acquisition server may further include an analyzing module 905. The analyzing module 905 may analyze the application run-time error report to obtain the dump file information. If the obtained dump file information includes a preset plug-in field, the analyzing module 905 may send a message indicating that the unknown application run-time error is caused by external factors to the sending module 903.

Figure 9D:
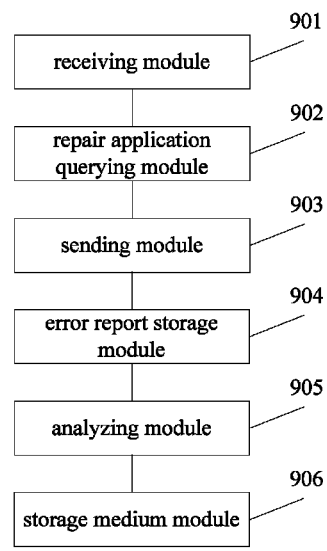
FIG. 9D is a diagram illustrating a structure of an error information acquisition server, according to an example embodiment of the present disclosure.

As shown in FIG. 9D, the error information acquisition server may further include a storage medium module 906, which may store the mapping relationship between the error identification and the repair application.

According to various embodiments of the present disclosure, the storage medium module 906 may be a random access memory, a hard disk, a flash memory, and so on.

The above-mentioned modules in the example embodiments of the present disclosure may be deployed either in a centralized or a distributed configuration; and may be either merged into a single module, or further split into a plurality of sub-modules.

Figure 10A:
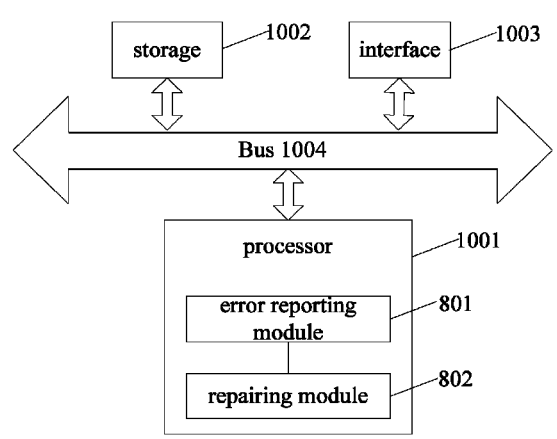
FIG. 10A is a diagram illustrating a hardware structure of a client, according to an example embodiment of the present disclosure.

FIG. 10A is a diagram illustrating a hardware structure of the client, according to an example embodiment of the present disclosure. As shown in FIG. 10A, the client may include a processor 1001, a storage 1002, at least one interface 1003, and a bus 1004.

According to various embodiments of the present disclosure, the storage 1002 may store computer readable instructions. The processor 1001 may execute the computer readable instructions to obtain dump file information and application version information of an application where a run-time error occurs, calculate the obtained dump file information and application version information according to a preset algorithm to get an error identification, and send an application run-time error report to an error information acquisition server, in which the error identification is carried in the error report. The processor 1001 may execute the computer readable instructions to receive a repair application issued by the error information acquisition server according to the error identification, and activate the repair application to perform repairing.

According to various embodiments of the present disclosure, the processor 1001 may execute the computer readable instructions stored in the storage 1002 to display, when the error identification is generated, the error identification and a message indicating whether or not to send the application run-time error report, receive sending-confirmation information and send the application run-time error report to the error information acquisition server.

Figure 10B:
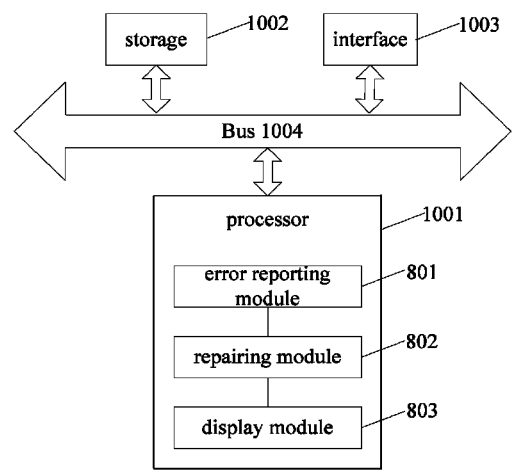
FIG. 10B is a diagram illustrating a hardware structure of a client, according to an example embodiment of the present disclosure.

As can be seen from the above description that, when the computer readable instructions stored in the storage 1002 are executed by the processor 1001, functions of the aforementioned error reporting module 801, the repairing module 802, and the display module 803 are implemented. Therefore, an example of the hardware structure of the client is shown in FIG. 10B.

Figure 11A:
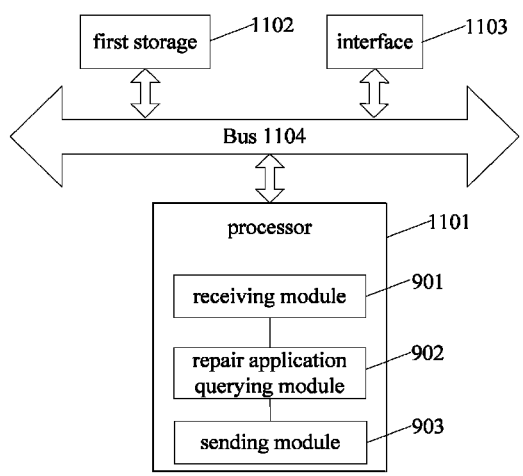
FIG. 11A is a diagram illustrating a hardware structure of an error information acquisition server, according to an example embodiment of the present disclosure.

FIG. 11A is a diagram illustrating a hardware structure of the error information acquisition server. As shown in FIG. 11A, the error information acquisition server may include a processor 1101, a first storage 1102, at least one interface 1103, and a bus 1104.

According to various embodiments of the present disclosure, the first storage 1102 may store computer readable instructions, and the processor 1101 may execute the computer readable instructions to receive an application run-time error report carrying an error identification that is sent from a client, query whether a repair application associated with the error identification is stored locally; when the repair application associated with the error identification is stored locally, send the repair application to the client.

According to various embodiments of the present disclosure, the processor 1101 may execute the computer readable instructions stored in the first storage 1102 to receive a configured repair application when the repair application associated with the error identification is not stored locally, establish a mapping relationship between the error identification and the configured repair application, and send the configured repair application to the client.

According to various embodiments of the present disclosure, the processor 1101 may execute the computer readable instructions stored in the first storage 1102 to query whether a version number of the repair application associated with the error identification is a latest version number of the repair application stored in the error information acquisition server; and when the version number of the repair application associated with the error identification is the latest version number of the repair application stored in the error information acquisition server, send the repair application associated with the error identification to the client; otherwise, send a latest version of the repair application to the client.

According to various embodiments of the present disclosure, the error information acquisition server may include a second storage 1105, which may store the received application run-time error report and the error identification.

According to various embodiments of the present disclosure, the second storage 1105 may store information of a user reporting the error identification.

According to various embodiments of the present disclosure, the processor 1101 may execute the computer readable instructions stored in the first storage 1102 to analyze the application run-time error report to obtain the dump file information; and when the obtained dump file information includes a preset plug-in field, send a message indicating that the unknown application run-time error is caused by external factors to the client.

According to various embodiments of the present disclosure, the error information acquisition server may include a third storage 1106, which may store the mapping relationship between the error identification and the repair application.

According to various embodiments of the present disclosure, the third storage 1106 may be a random access memory, a hard disk, a flash memory, and so on.

Figure 11B:
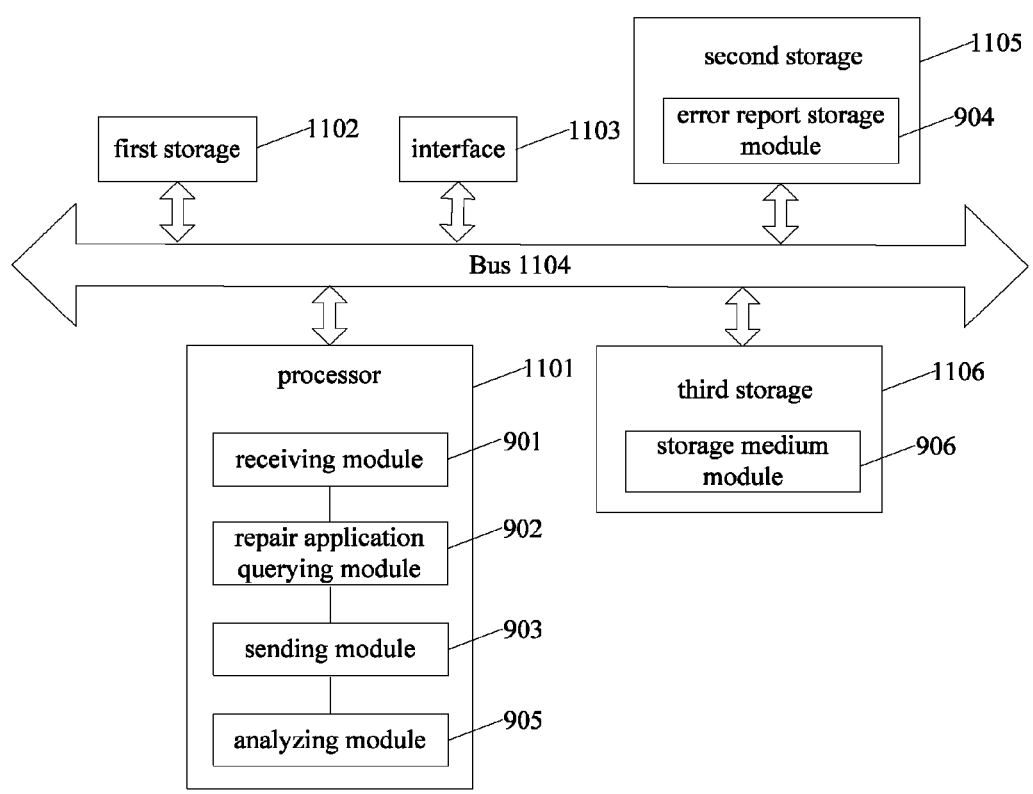
FIG. 11B is a diagram illustrating a hardware structure of an error information acquisition server, according to an example embodiment of the present disclosure.

As can be seen from the above description that, when the computer readable instructions stored in the first storage 1102 are executed by the processor 1101, functions of the aforementioned receiving module 901, the repair application querying module 902, the sending module 903, and the analyzing module 905 are implemented. In addition, the second storage 1105 and the third storage 1106 may respectively implement the functions of the aforementioned error report storage module 904 and the storage medium module 906. Therefore, an example of the hardware structure of the error information acquisition server is shown in FIG. 11B.

The above-mentioned modules in the example embodiments of the present disclosure may be software (e.g., machine readable instructions stored in a non-transitory computer readable medium and executable by a processor), hardware (e.g., the processor of an Application Specific Integrated Circuit (ASIC)), or a combination thereof. For example, a hardware module may comprise dedicated circuitry or logic that is permanently configured (e.g., as a special-purpose processor, such as a field programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

As can be seen from the above technical scheme that according to various embodiments of the present disclosure, the application run-time error is automatically repaired without pre-storing or querying by the user the information of the server designated by the application. The user does not need to access the server designated by the application, so that the application run-time error is timely repaired and the time required for repairing the application run-time error is reduced, and therefor user experiences are enhanced.

Those skilled in the art may understand that all or part of the procedures of the methods of the above embodiments may be implemented by hardware modules following computer readable instructions. The computer readable instructions may be stored in a computer-readable storage medium and may include a plurality of instructions for making a computer apparatus (which may be a mobile phone, a personal computer, a server or a network apparatus) implement the methods recited in the embodiments of the present disclosure. The storage medium may be diskette, CD, ROM (Read-Only Memory) or RAM (Random Access Memory), and etc.

The above are several embodiments of the present disclosure, and are not used for limiting the protection scope of the present disclosure. Any modifications, equivalents, improvements, etc., made under the principle of the present disclosure should be included in the protection scope of the present disclosure.

The invention claimed is:

1. A method for repairing run-time errors, comprising:
   obtaining, by a client, dump file information and version information of an application where a run-time error occurs;
   calculating the obtained dump file information and version information according to a preset algorithm to get an error identification associated with the run-time error;
   sending an error report carrying the error identification to an error information acquisition server;
   receiving a repair application issued by the error information acquisition server according to the error identification; and
   activating the repair application to perform repairing;
   wherein the operation of receiving the repair application issued by the error information acquisition server according to the error identification comprises:
   receiving, by the error information acquisition server, the error report carrying the error identification;
   querying whether the repair application associated with the error identification is stored locally;
   when the repair application is not stored locally, storing the received error report and the error identification, and storing information of a user reporting the error identification;
   receiving a second repair application from exterior of the error information acquisition server;
   establishing a mapping relationship between the error identification and the second repair application; and
   issuing the second repair application to the client corresponding to the stored information of the user reporting the error identification.

2. The method of claim 1, wherein the operation of receiving the repair application issued by the error information acquisition server according to the error identification further comprises:
   when the repair application is stored locally, issuing, by the error information acquisition server, the repair application to the client.

3. The method of claim 2, wherein the operation of issuing the repair application to the client when the repair application is stored locally comprises:
   querying, by the error information acquisition server, whether a version number of the repair application associated with the error identification is a latest version number of the repair application stored in the error information acquisition server; and
   when the version number of the repair application associated with the error identification is the latest version number of the repair application stored in the error information acquisition server, issuing the repair application associated with the error identification; otherwise, issuing a latest version of the repair application.

4. The method of claim 1, further comprising:
   analyzing, by the error information acquisition server, the error report to obtain the dump file information; and
   when the dump file information comprises a preset plug-in field, carrying a message indicating that the run-time error is caused by external factors when the repair application is issued to the client.

5. The method of claim 4, wherein the preset algorithm comprises the fifth edition encryption algorithm of Message Digest Algorithm (MD5) and Base64 encryption algorithm.

6. The method of claim 5, wherein the error report is generated according to the dump file information, the version information, and log information.

7. A client, comprising a processor and a non-transitory storage, wherein
   the non-transitory storage is to store machine readable instructions to be executed by the processor, wherein the machine readable instructions comprise an error reporting instruction and a repairing instruction; and
   the processor is to read the error reporting instruction stored in the non-transitory storage to perform a process of:
   obtaining dump file information and version information of an application where a run-time error occurs,
   calculating the obtained dump file information and version information according to a preset algorithm to get an error identification associated with the run-time error, and
   sending an error report carrying the error identification to an error information acquisition server; and
   the processor is to read the repairing instruction stored in the non-transitory storage to perform a process of:
   receiving a repair application issued by the error information acquisition server according to the error identification, and
   activating the repair application to perform repairing;
   wherein when the processor reads the repairing instruction stored in the non-transitory storage to perform the process of receiving the repair application issued by the error information acquisition server according to the error identification, the error information acquisition server receives the error report carrying the error identification, queries whether the repair application associated with the error identification is stored locally, when the repair application is not stored locally, stores the received error report and the error identification, stores information of a user reporting the error identification, receives a second repair application from exterior of the error information acquisition server, establishes a mapping relationship between the error identification and the second repair application, and issues the second repair application to the client corresponding to the stored information of the user reporting the error identification;

the processor is to read the repairing instruction stored in the non-transitory storage to perform a process of:

receiving the second repair application.

8. The client of claim 7, wherein the machine readable instructions further comprise a display instruction, and the processor is to read the display instruction stored in the non-transitory storage to perform a process of:

displaying, when the error reporting module generates the error identification, the error identification and a message indicating whether or not to send the error report, and receiving sending-confirmation information and trigger the error reporting module to send the error report to the error information acquisition server.

9. An error information acquisition server, comprising a processor and a non-transitory storage, wherein the non-transitory storage is to store machine readable instructions to be executed by the processor, wherein the machine readable instructions comprise a receiving instruction, a repair application querying instruction, an error report storage instruction and a sending instruction;

the processor is to read the receiving instruction stored in the non-transitory storage to perform a process of:

receiving an error report carrying an error identification associated with a run-time error that is sent from a client;

the processor is to read the repair application Querying instruction stored in the non-transitory storage to perform a process of:

querying whether a repair application associated with the error identification is stored locally, and when the repair application associated with the error identification is not stored locally, receiving an externally-configured repair application, and establishing a mapping relationship between the error identification and the externally-configured repair application;

the processor is to read the error report storage instruction stored in the non-transitory storage to perform a process of:

storing the received error report and the error identification, and storing information of a user reporting the error identification; and the processor is to read the sending instruction stored in the non-transitory storage to perform a process of:

when the repair application associated with the error identification is stored locally, sending the repair application to the client, and when the repair application associated with the error identification is not stored locally, sending the externally-configured repair application to the client corresponding to the information of the user reporting the error identification.

10. The error information acquisition server of claim 9, wherein the machine readable instructions further comprise an analyzing instruction, and the processor is to read the analyzing instruction stored in the non-transitory storage to perform a process of:

analyzing the error report to obtain the dump file information, and when the obtained dump file information comprises a preset plug-in field, sending a message indicating that the run-time error is caused by external factors to the sending module.

11. The error information acquisition server of claim 9, wherein the processor is to read the repair application querying instruction stored in the non-transitory storage to further perform a process of:

querying whether a version number of the repair application associated with the error identification is a latest version number of the repair application stored in the error information acquisition server, and when the version number of the repair application associated with the error identification is the latest version number of the repair application stored in the error information acquisition server, sending the repair application associated with the error identification to the sending module; otherwise, sending a latest version of the repair application to the sending module.

12. A system for repairing run-time errors, comprising:

a client comprising a first processor and a first non-transitory storage and an error information acquisition server comprising a second processor and a second non-transitory storage, wherein the first non-transitory storage is to store machine readable instructions to be executed by the first processor and the second non-transitory storage is to store machine readable instructions to be executed by the second processor;

the first processor is to read the machine readable instructions stored in the first non-transitory storage to perform a process of:

sending an error report carrying a calculated error identification associated with a run-time error to the error information acquisition server, and receiving a repair application issued by the error information acquisition server according to the error identification, and activating the repair application to perform repairing; and the second processor is to read the machine readable instructions stored in the second non-transitory storage to perform a process of:

receiving the error report carrying the error identification, querying whether the repair application associated with the error identification is stored locally, when the repair application is not stored locally, storing the received error report and the error identification, and storing information of a user reporting the error identification, receiving a second repair application from exterior of the error information acquisition server, establishing a mapping relationship between the error identification and the second repair application, and issuing the second repair application to the client corresponding to the stored information of the user reporting the error identification.

13. The system of claim 12, wherein the second processor is to read the machine readable instructions stored in the second non-transitory storage to further perform a process of:

analyzing the error report to obtain dump file information, and when the obtained dump file information comprises a preset plug-in field, carrying a message indicating that the run-time error is caused by external factors when issuing the repair application to the client.

14. The system of claim 12, wherein the machine readable instructions stored in the first non-transitory storage comprise an error reporting instruction and a repairing instruction:
- the first processor is to read the error reporting instruction to perform a process of:
- obtaining dump file information and version information of an application where the run-time error occurs,
- calculating the obtained dump file information and version information according to a preset algorithm to get the error identification, and
- sending the error report carrying the error identification to the error information acquisition server; and
- the first processor is to read the repairing instruction to perform a process of:
- receiving the repair application issued by the error information acquisition server according to the error identification, and
- activating the repair application to perform repairing.

15. The system of claim 12, wherein the machine readable instructions stored in the second non-transitory storage comprise a receiving instruction, a repair application querying instruction, an error report storage instruction and a sending instruction
- the first processor is to read the receiving instruction to perform a process of:
- receiving the error report carrying the error identification that is sent from the client, and
- the first processor is to read the repair application querying instruction to perform a process of:
- querying whether the repair application associated with the error identification is stored locally, and
- the first processor is to read the error report storage instruction to perform a process of:
- storing the received error report and the error identification; and
- the first processor is to read the sending instruction to perform a process of:
- when the repair application associated with the error identification is stored locally, sending the repair application to the client.

* * * * *